(12) United States Patent
Hart et al.

(10) Patent No.: US 7,328,036 B2
(45) Date of Patent: Feb. 5, 2008

(54) METHOD AND APPARATUS REDUCING PTT CALL SETUP DELAYS

(75) Inventors: Thomas B. Hart, West Dundee, IL (US); Ronald T. Crocker, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 827 days.

(21) Appl. No.: 10/818,293

(22) Filed: Apr. 5, 2004

(65) Prior Publication Data

US 2005/0122937 A1 Jun. 9, 2005

Related U.S. Application Data

(60) Provisional application No. 60/527,603, filed on Dec. 5, 2003.

(51) Int. Cl.
*H04Q 7/20* (2006.01)
*H04L 12/16* (2006.01)

(52) U.S. Cl. ............... 455/518; 455/416; 455/521; 455/435.1; 370/335; 370/260

(58) Field of Classification Search ......... 455/416, 455/521, 517, 518, 519, 520, 422, 435.1, 455/428; 379/37; 370/260, 328, 202.01, 370/389, 386
See application file for complete search history.

(56) References Cited

U.S. PATENT DOCUMENTS

| | | | |
|---|---|---|---|
| 6,725,053 B2 | 4/2004 | Rosen et al. | |
| 6,738,617 B2 | 5/2004 | Rosen et al. | |
| 6,781,963 B2* | 8/2004 | Crockett et al. | 370/260 |
| 6,873,854 B2 | 3/2005 | Crockett et al. | |
| 6,876,636 B2 | 4/2005 | Sinnarajah et al. | |
| 6,898,436 B2* | 5/2005 | Crockett et al. | 455/518 |
| 6,904,288 B2 | 6/2005 | Rosen et al. | |
| 6,912,401 B2 | 6/2005 | Rosen et al. | |
| 6,922,561 B2 | 7/2005 | Chen et al. | |
| 7,031,291 B2* | 4/2006 | Chen et al. | 370/342 |
| 7,130,282 B2* | 10/2006 | Black | 370/296 |
| 2002/0172165 A1 | 11/2002 | Rosen et al. | |
| 2002/0197994 A1 | 12/2002 | Harris et al. | |
| 2004/0219940 A1 | 11/2004 | Kong et al. | |

FOREIGN PATENT DOCUMENTS

| | | |
|---|---|---|
| WO | 02093953 A1 | 11/2002 |
| WO | 03092247 A2 | 11/2003 |

* cited by examiner

*Primary Examiner*—Tony T. Nguyen
(74) *Attorney, Agent, or Firm*—Jeffrey K. Jacobs (57) ABSTRACT

Various embodiments are described herein to address the need for providing substantially reduced PTT call setup delays. Modifications to channel assignment request messaging (400), such as an IS-2000 Reconnect Message and an IS-2000 Origination Message, are described. In addition, the use of common control channel signaling (e.g., 201), changes to page response messaging (e.g., 301) and new uses for A9-Short Data Delivery messaging (e.g., 203 and 303) are described. Embodiments incorporating some or all of these protocol changes, can provide reduced end-to-end call setup time for PTT as it presently exists in IS-2000 systems.

54 Claims, 4 Drawing Sheets

| FIELD | LENGTH (bits) |
|---|---|
| DBM_INCL | 0 OR 1 |
| MSG_NUMBER | 0 OR 8 |
| BURST_TYPE | 0 OR 6 |
| NUM_MSGS | 0 OR 8 |
| NUM_FIELDS | 0 OR 8 |

NUM_FIELDS OCCURRENCES OF THE FOLLOWING FIELD:

{ (NUM_FIELDS)

| CHARi | 8 |
|---|---|

} (NUM_FIELDS)

| MOBILE COUNTRY CODE | 10 |
|---|---|
| COUNTRY_BURST_TYPE | 6 |
| REMAINING CHARi FIELDS | 8X (NUM_FIELDS −2) |

| EXTENDED_BURST_TYPE | 16 |
|---|---|
| REMAINING CHARi FIELDS | 8X (NUM_FIELDS −2) |

METHOD AND APPARATUS REDUCING PTT CALL SETUP DELAYS

REFERENCE(S) TO RELATED APPLICATION(S)

The present application claims priority from provisional application, Ser. No. 60/527,603, entitled "METHOD AND APPARATUS REDUCING PTT CALL SETUP DELAYS," filed Dec. 5, 2003, which is commonly owned and incorporated herein by reference in its entirety.

This application is related to a co-pending application, Ser. No. 09/887,172, entitled "DISPATCH CALL ORIGINATION AND SET UP IN A CDMA MOBILE COMMUNICATION SYSTEM," filed Jun. 22, 2001, which is assigned to the assignee of the present application.

This application is related to a co-pending application, Ser. No. 10/139,867, entitled "INTERFERENCE-EFFICIENT METHOD AND APPARATUS TO PROVIDE CDMA SERVICES," filed May 6, 2002, which is assigned to the assignee of the present application.

This application is related to a co-pending application, Ser. No. 10/108,405, entitled "METHOD AND APPARATUS FOR WIRELESS DATA TRANSFER WITH REDUCED DELAY," filed Mar. 28, 2002, which is assigned to the assignee of the present application.

This application is related to a co-pending application, Ser. No. 10/108,783, entitled "METHOD AND APPARATUS TO REDUCE WIRELESS DATA TRANSFER DELAY," filed Mar. 28, 2002, which is assigned to the assignee of the present application.

This application is related to a co-pending application, Ser. No. 10/303,255, entitled "METHOD FOR EXPEDITING TRANSITIONS BETWEEN STATES OF OPERATION IN COMMUNICATIONS EQUIPMENT," filed Nov. 25, 2002, which is assigned to the assignee of the present application.

FIELD OF THE INVENTION

The present invention relates generally to mobile communication systems and, in particular, to reducing delays associated with push-to-talk (PTT) service call setup.

BACKGROUND OF THE INVENTION

One existing approach to providing push-to-talk (PTT) calls over Code Division Multiple Access (CDMA) systems, such as IS-2000 compliant systems, is to first establish a packet data connection and then send the PTT call control information over this data connection. However, this can be relatively slow since the originating mobile station (MS) must first be assigned a traffic channel (TCH) and then establish a data connection before its origination-side PTT call control information can be conveyed. Similarly, the MS targeted by the call is first paged, assigned a TCH, and then must establish a data connection before it can send its target-side PTT call control information or receive the origination-side call control information. This process, in which session establishment messages are sent after data connections have been established, can result in PTT call setup times of approximately 10-15 seconds. Many users are likely find such wait times for a service like PTT unacceptable. Accordingly, it would be highly desirable to have a method and apparatus providing substantially reduced PTT call setup delays.

DETAILED DESCRIPTION OF EMBODIMENTS

Various embodiments are described herein to address the need for providing substantially reduced PTT call setup delays. Modifications to channel assignment request messaging, such as an IS-2000 Reconnect Message and an IS-2000 Origination Message, are described. In addition, the use of common control channel signaling, changes to page response messaging and new uses for A9-Short Data Delivery messaging are described. Embodiments incorporating some or all of these protocol changes, can provide reduced end-to-end call setup time for PTT as it presently exists in IS-2000 systems. As an example, embodiments of the present invention can bring call setup times down from 10-15 seconds to under 3 seconds.

Figure 1:
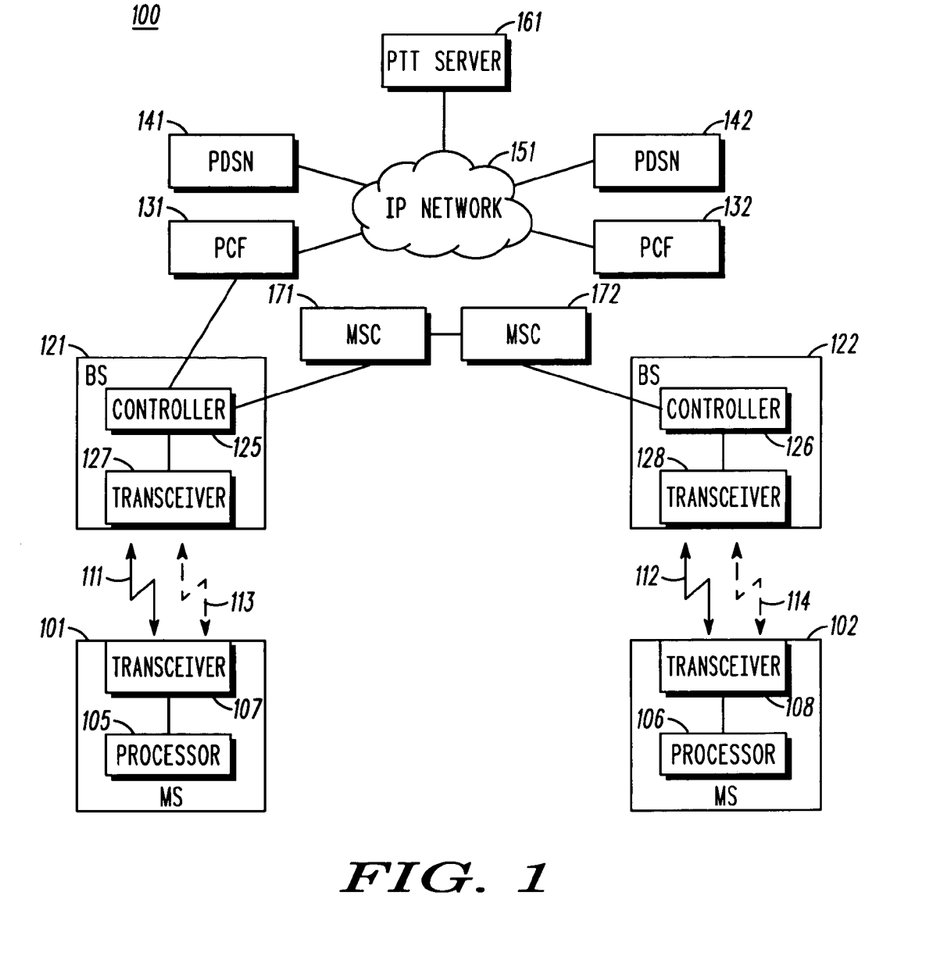
FIG. 1 is a block diagram depiction of a mobile communication system in accordance with multiple embodiments of the present invention.

The disclosed embodiments can be more fully understood with reference to FIGS. 1-4. FIG. 1 is a block diagram depiction of a mobile communication system 100 in accordance with multiple embodiments of the present invention. Communication system 100 is a well-known Code Division Multiple Access (CDMA) system, specifically a cdma2000 system, which is based on the Telecommunications Industry Association/Electronic Industries Association (TIA/EIA) standards IS-2000 and IS-2001, suitably modified to implement the present invention. Alternative embodiments of the present invention may be implemented in communication systems that employ other technologies sufficiently similar to IS-2000 and IS-2001.

Those skilled in the art will recognize that FIG. 1 does not depict all of the network equipment necessary for system 100 to operate but only those system components and logical entities particularly relevant to the description of embodiments of the present invention. In particular, the network equipment of system 100 comprises components such as base stations (BSs) 121 and 122, mobile switching centers (MSCs) 171 and 172, packet control functions (PCFs) 131 and 132, packet data serving node (PDSNs) 141 and 142, internet protocol (IP) network 151, and PTT server 161. Generally, BSs, MSCs, PCFs, PDSNs, IP networks, and PTT servers are known in the art. For example, BSs are well-known to comprise components such as base station controllers (BSCs) and base transceiver systems (BTSs), neither of which are specifically shown in FIG. 1.

Instead, BSs 121 and 122 are depicted in FIG. 1 as respectively comprising controllers 125 and 126 and transceivers 127 and 128. In general, components such as BS controllers and BS transceivers are well-known. For example, BS controllers are known to comprise basic components such as, but not limited to, microprocessors, microcontrollers, memory devices, and/or logic circuitry. Such BS components are typically adapted to implement algorithms and/or protocols that have been expressed using high-level design languages or descriptions, expressed using computer instructions, expressed using messaging flow diagrams, and/or expressed using logic flow diagrams. Thus, given an algorithm, a logic flow, a messaging flow, and/or a protocol specification, those skilled in the art are aware of the many design and development techniques available to implement a BS that performs the given logic.

Thus, BSs 121 and 122 represent known BSs that have been adapted, in accordance with the description herein, to implement multiple embodiments of the present invention. Furthermore, controllers 125 and 126 and transceivers 127 and 128 are not intended to precisely correspond to BSCs and BTSs, respectively. Rather, controllers 125 and 126 and transceivers 127 and 128 each represent devices that can extend across separate physical components that perhaps are not even co-located.

BSs 121 and 122 use air interfaces comprising channels 111-114 for communication with remote units 101 and 102. IS-2000 terminology refers to remote units as mobile stations (MSs); however, remote units are not necessarily mobile or able to move. Thus, remote unit/MS platforms are known in the art to include devices such as mobile phones, computers, personal digital assistants, gaming devices, etc. In particular, MSs 101 and 102 each respectively comprise processors 105 and 106, transceivers 107 and 108, keypads (not shown), speakers (not shown), microphones (not shown), and displays (not shown). Processors, transceivers, keypads, speakers, microphones, and displays as used in MSs are all well-known in the art.

For example, MS processors are known to comprise basic components such as, but not limited to, microprocessors, digital signal processors (DSPs), microcontrollers, memory devices, and/or logic circuitry. Such MS components are typically adapted to implement algorithms and/or protocols that have been expressed using high-level design languages or descriptions, expressed using computer instructions, expressed using messaging flow diagrams, and/or expressed using logic flow diagrams. Thus, given an algorithm, a logic flow, a messaging flow, and/or a protocol specification, those skilled in the art are aware of the many design and development techniques available to implement a BS that performs the given logic. Thus, MSs 101 and 102 represent known MSs that have been adapted, in accordance with the description herein, to implement embodiments of the present invention.

Figure 2:
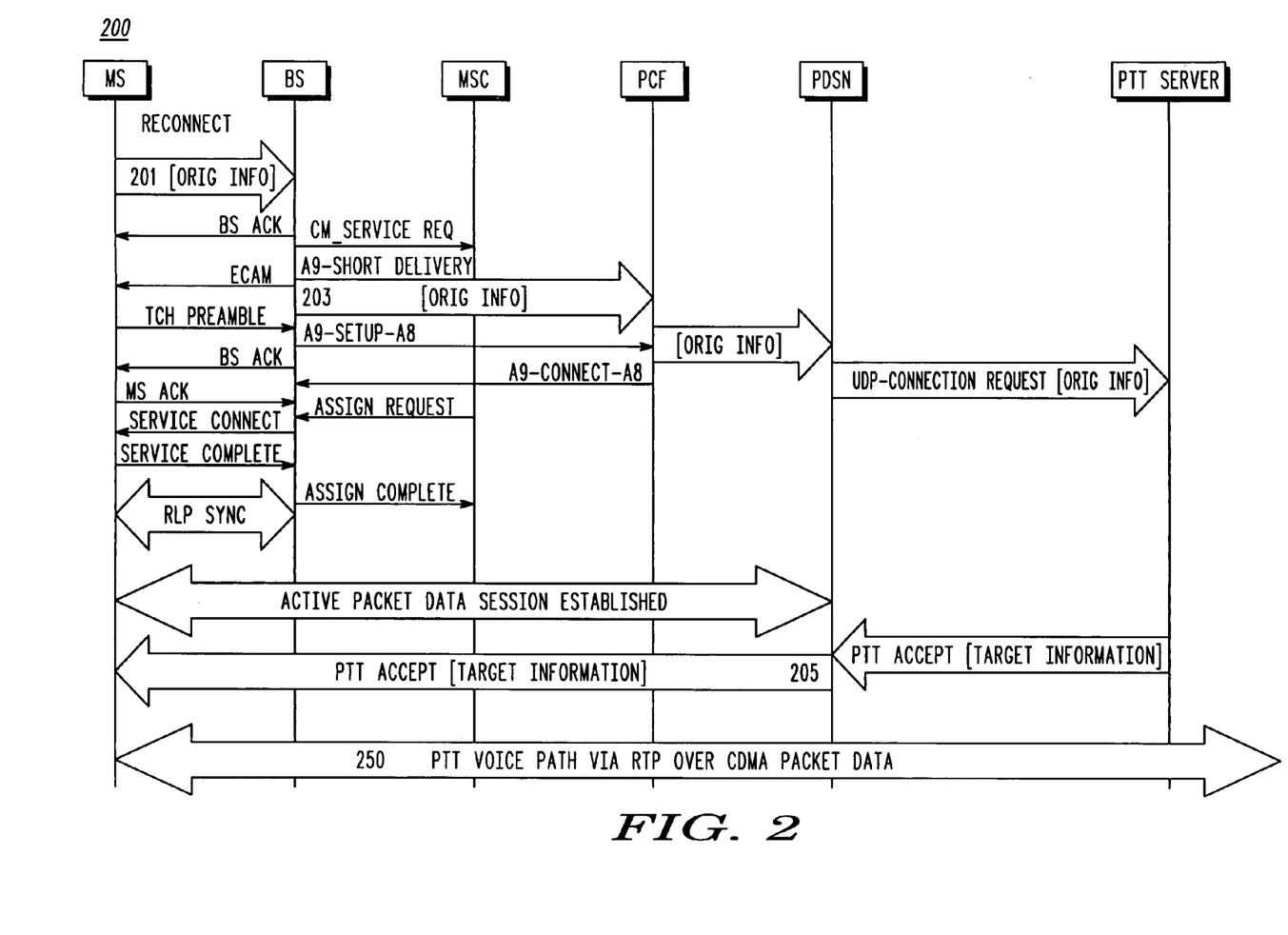
FIG. 2 is a messaging flow diagram depicting originator-side call setup messaging for a PTT call in accordance with multiple embodiments of the present invention.
Figure 3:
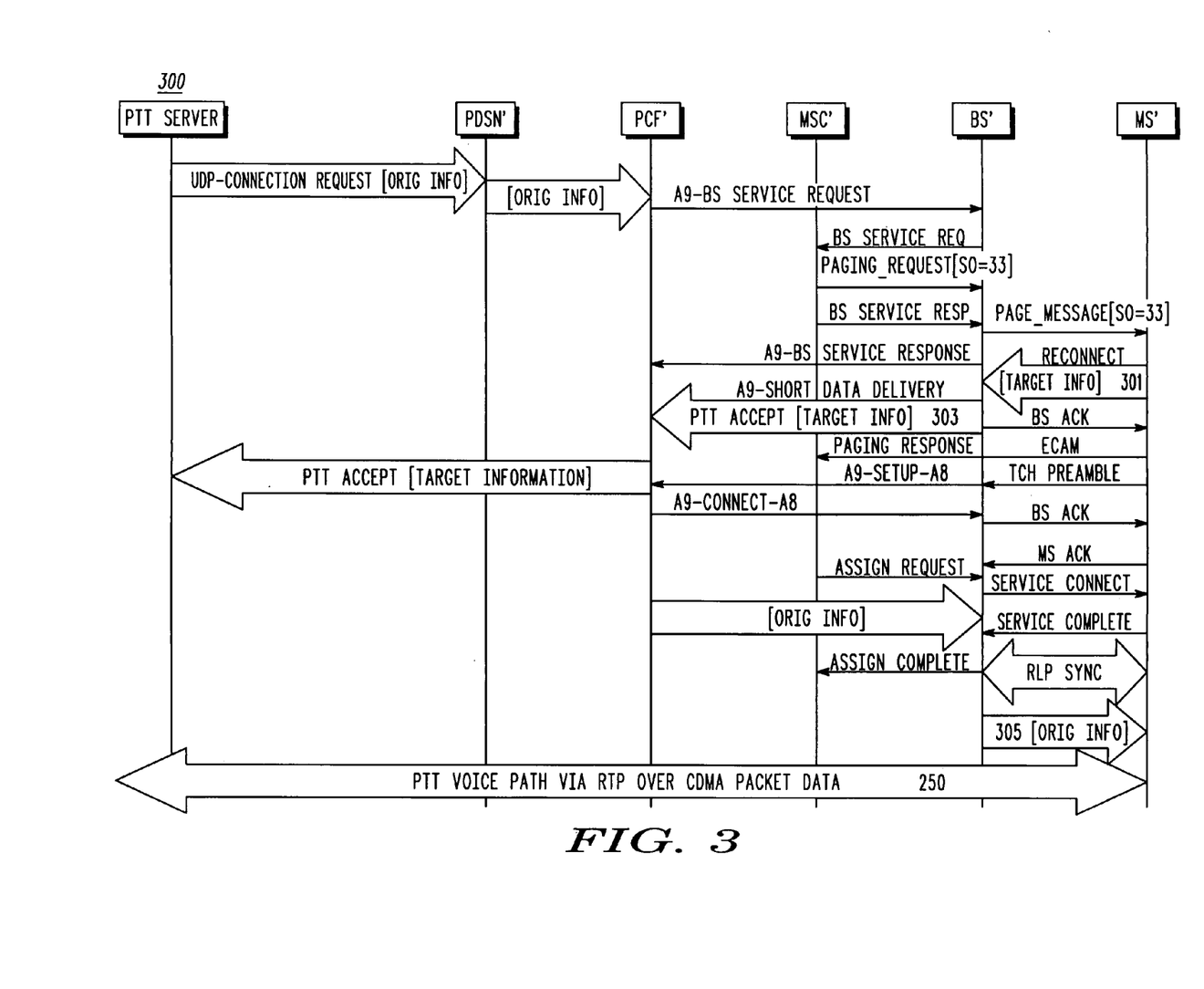
FIG. 3 is a messaging flow diagram depicting target-side call setup messaging for the PTT call in accordance with multiple embodiments of the present invention.

Operation of embodiments in accordance with the present invention occurs substantially as follows. FIGS. 2 and 3 show messaging flow diagrams 200 and 300 depicting call setup messaging for a PTT call in accordance with multiple embodiments of the present invention. When processor 105 of MS 101 detects a user PTT request indication, such as a PTT button being depressed by the MS user, processor 105 sends to BS 121 PTT connection request information via transceiver 107 and a CDMA common control channel, generically represented by air interface resource 111. IS-2000 channels 111 and 112 each comprises a variety of well-known non-traffic channel types, such as broadcast channels, paging channels, access channels, and common control channels. IS-2000 channels 113 and 114 each comprise dedicated traffic channels, which are dynamically assigned and de-assigned to support user services.

The PTT connection request information may include information such as originator unit information, PTT server information, call type information, and PTT target information. In a first embodiment, the originator unit information includes the IP address of MS 101, the PTT server information includes the IP address of PTT server 161, the PTT target information includes a PTT target address (that identifies a PTT unit or PTT group), and the call type information indicates a call type such as barge-in (indicating that the audio starts playing without user intervention at the target mobile) or invited (indicating that the target user is asked to accept the call prior to audio playing at the target mobile). In alternative embodiments, other addressing/identifier schemes may be used instead of, or in addition to, IP addresses and other, or additional, call types may be included. Also, the PTT connection request information may only include a subset of the information described herein and/or may include additional information related to PTT call control or setup.

In the first embodiment, processor 105 sends the PTT connection request information within a channel assignment request. The channel assignment request may take the form of an IS-2000 Reconnect message or an IS-2000 Origination message that has been extended to include a data burst message (DBM) portion. The PTT connection request information is contained within this DBM portion. Thus, a modified IS-2000 message results, such as that depicted by reconnect message 201. However, in alternate embodiments a channel assignment request and the PTT connection request information may be conveyed by the MS using multiple messages. For example, the MS may send a DBM and a channel assignment request separately, thereby avoiding the need to modify present IS-2000 channel assignment request messaging.

Figure 4:
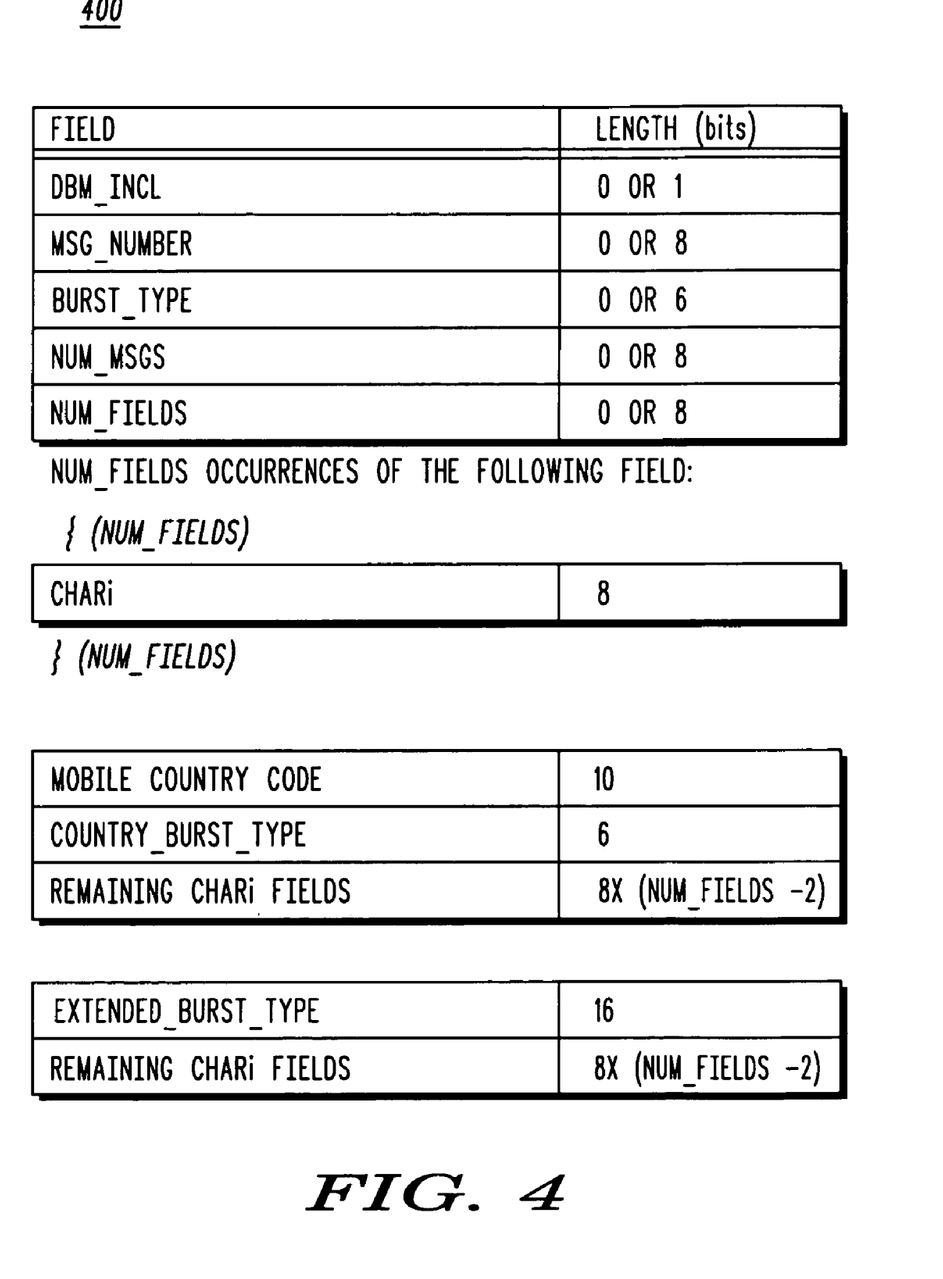
FIG. 4 is a table depicting exemplary bit definitions for fields to be added to existing messaging in accordance with multiple embodiments of the present invention.

A person of skill in the art will, of course, realize that there are many ways to convey additional information within channel assignment request messaging generally. FIG. 4 is a table 400 depicting exemplary bit definitions for fields to be added to existing messaging in accordance with multiple embodiments of the present invention. A detailed description of table 400 fields, as added to an IS-2000 Reconnect message, is provided below as an example of modified messaging that can support the sending of PTT connection request information within a channel assignment request:

Section and table references are to C.P0005-D/TIA-2000.5-D (3l GPP2 reference/TIA reference). Changes described are to a Reconnect Message as defined in Section 2.7.1.3.2.15.

SDB_INCL

Data Burst Message included indicator.

If P_REV_IN_USE$_S$ is less than eleven, the mobile station shall omit this field; otherwise, the mobile station shall include this field and set it as follows:

The mobile station shall set this field to '1' if this message carries a Data Burst Message; otherwise, the mobile station shall set this field to '0'.

MSG_NUMBER

Message number within the data burst stream.

The mobile station shall set this field to the number of this message within the data burst stream.

BURST_TYPE

Data burst type.

The mobile station shall set the value of this field for the type of this data burst as defined in "TSB58-B, Administration of Parameter Value Assignments for TIA/EIA Wideband Spread Spectrum Standards, December 1999." If the mobile station sets this field equal to '111110', it shall set the first two CHARi fields of this message equal to EXTENDED_BURST_TYPE_INTERNATIONAL as described in the definition of CHARi below. If the mobile station sets this field equal to '111111', it shall set the first two CHARi fields of this message equal to the EXTENDED_BURST_TYPE as described in the definition of CHARi below.

NUM_MSGS

Number of messages in the data burst stream.

The mobile station shall set this field to the number of messages within this data burst stream.

NUM_FIELDS

Number of characters in this message.

The mobile station shall set this field to the number of CHARi fields included in this message.

CHARi

Character.

The mobile station shall include NUM_FIELDS occurrences of this field. The mobile station shall set these fields to the corresponding octet of the data burst stream.

If the BURST_TYPE field of this message is equal to '111110', the first two CHARi octets shall represent a 16 bit EXTENDED_BURST_TYPE_INTERNATIONAL field, which is encoded in accordance with that shown in messaging extension 400. The first ten bits of this field contain a binary mapping of the Mobile Country Code (MCC). Encoding of the MCC shall be as specified in Section 2.3.1.3. The remaining six bits of the EXTENDED_BURST_TYPE_INTERNATIONAL field shall specify the COUNTRY_BURST_TYPE. The mobile station shall set the value of the COUNTRY_BURST_TYPE according to the type of this data burst as defined in standards governed by the country where this data burst type is to be used.

If the BURST_TYPE field of this message is equal to '111111', the first two CHARi octets shall represent a single, 16 bit, EXTENDED_BURST_TYPE field, as shown in messaging extension 400. The mobile station shall set the value of the EXTENDED_BURST_TYPE according to the type of this data burst as defined in "TSB58-B, Administration of Parameter Value Assignments for TIA/EIA Wideband Spread Spectrum Standards, December 1999."

In the first embodiment, controller 125 of BS 121 receives the PTT connection request information and channel assignment request (i.e., reconnect message 201) via transceiver 127. In existing IS-2000 systems, call control information was not sent by the MS until after a TCH was established between the MS and BS. While in the first embodiment, such call control information is conveyed with the channel assignment request via a common control channel. Sending such information earlier in the call setup sequence, can reduce the overall PTT call setup delay that a user experiences. This will become more apparent as the description continues.

Having received the PTT information early in call setup, controller 125 of BS 121 sends the PTT connection request information to PCF 131 using A9-Short Data Delivery message 203. In existing IS-2000 systems, call control information was sent as A8-Bearer data. However, to save time, BS 121 does not wait for the corresponding A9/A8 establishment with PCF 131 but sends the PTT connection request information using the A9-Short Data Delivery mechanism prior to A9/A8 establishment. Having received both the PTT connection request information and a channel assignment request, BS 121 may concurrently proceed to both send the PTT connection request information to PCF 131 and assign MS 101 a traffic channel, as depicted by TCH 113. However, due to the importance of reducing PTT call setup delay, BS 121 may prioritize the sending of PTT information to PCF 131, assigning TCH 113 afterwards.

PCF 131 sends the PTT connection request information on to PTT server 161 (perhaps as indicated in the information itself) via serving PDSN 141. PTT server 161 is then able to coordinate the requested PTT service in accordance with the PTT connection request information. PTT service may target a PTT unit or PTT group. FIGS. 1-3 illustrate the case where a PTT unit, or a single MS, is targeted, and also that this target MS (MS 102) is served by a different BS, PCF, and PDSN. Clearly, these are assumptions made for the purpose of illustration and to provide an example. They are not to be viewed as limiting, since the concepts and mechanisms underlying these examples can be applied to the many other cases and scenarios not directly addressed.

PTT server 161 sends the PTT connection request information and a request to PCF 132 (via PDSN 142) to establish a data connection with target MS 102. In turn, PCF 132 triggers messaging that causes BS 122 (i.e., controller 126 via transceiver 128) to page MS 102 using paging channel 112, indicating that a data connection is requested (e.g., service option=33). MS 102 (i.e., processor 106 via transceiver 108) receives the page. However, in the first embodiment, MS 102 does not respond with an IS-2000 Page Response as in existing systems. Rather, MS 102 anticipates, based on the data connection request, that a PTT call is being set up and, therefore, sends PTT connection acceptance information via CDMA control channel 112 in place of an IS-2000 Page Response. In the first embodiment and as described with respect to modified reconnect message 201 above, MS 102 sends the PTT connection acceptance information within modified reconnect message 301 (e.g., within a DBM portion). However, in alternative embodiments, a DBM and a reconnect message may be sent separately to convey the PTT connection acceptance information.

Similar to the PTT connection request information, the PTT connection acceptance information may include information such as PTT server information and PTT target information. In the first embodiment, the PTT server information includes the IP address of PTT server 161 and the PTT target information includes the IP address of MS 102. In alternative embodiments, other addressing/identifier schemes may be used instead of, or in addition to, IP addresses. Also, the PTT connection acceptance information may only include a subset of the information described herein and/or may include additional information related to PTT call control or setup.

In the first embodiment, controller 126 of BS 122 receives the PTT connection acceptance information and channel assignment request (i.e., reconnect message 301) via transceiver 128. As discussed above in existing IS-2000 systems, call control information was not sent by the MS until after a TCH was established between the MS and BS. Thus, an IS-2000 Page Response followed by channel assignment messaging, service connect messaging, and TCH acquisition would all proceed sending call control information. Instead, in the first embodiment, such call control information is effectively conveyed as a page response/channel assignment request via a common control channel. And again, sending such information earlier in the call setup sequence, can reduce the overall PTT call setup delay that a user experiences.

Having received the PTT information early in call setup, controller 126 of BS 122 sends the PTT connection acceptance information to PCF 132 using A9-Short Data Delivery message 303. As discussed above in existing IS-2000 systems, call control information was sent as A8-Bearer data. However, to save time, BS 122 does not wait for the corresponding A9/A8 establishment with PCF 132 but sends the PTT connection acceptance information using the A9-Short Data Delivery mechanism prior to A9/A8 establishment. Having received both the PTT connection acceptance information and a page response/channel assignment request, BS 122 may concurrently proceed to both send the PTT connection acceptance information to PCF 132 and assign MS 102 a traffic channel, as depicted by TCH 114. However, due to the importance of reducing PTT call setup delay, BS 122 may prioritize the sending of PTT information to PCF 132, assigning TCH 114 afterwards.

PCF 132 sends the PTT connection acceptance information on to PTT server 161 via serving PDSN 142. PTT server 161 then sends the PTT connection acceptance information (or only the subset of information needed by MS 101) to PDSN 141. As discussed above, BS 121 and BS 122 respectively assign TCHs 113 and 114 to MSs 101 and 102. Thus, MSs 101 and 102 (i.e., respectively processors 105 and 106 via transceivers 107 and 108) receive channel assignment messaging and acquire their TCHs. In the first embodiment, after acquiring their respective TCHs, each MS receives the PTT connection information associated with the other MS via each MS's respective TCH. Hence, MS 101 receives messaging 205 containing the PTT connection acceptance information as forwarded by PTT server 161, and likewise, MS 102 receives messaging 305 containing the PTT connection request information as forwarded by PTT server 161. Thus, MSs 101 and 102, using their respective TCHs, establish active packet data sessions in which they are able exchange PTT voice information (using Real Time Protocol, e.g.). In other words, employing the embodiments described above, the MS users can speak to one another using the PTT service and experience less setup delays.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for reducing push-to-talk (PTT) call setup delays comprising:
    detecting, by an originator unit, a user PTT request indication;
    sending, by the originator unit to a base station (BS), PTT connection request information via a CDMA common control channel;
    sending, by the originator unit to the BS, a channel assignment request via the CDMA common control channel; and
    receiving, by the originator unit, an indication of PTT connection acceptance corresponding to the PTT connection request information.

2. The method of claim 1, wherein the PTT connection request information comprises information from the group consisting of originator unit information, PTT server information, call type information, and PTT target information.

3. The method of claim 2, wherein the originator unit information comprises an IP address of the originator unit.

4. The method of claim 2, wherein the PTT server information comprises an IP address of a PTT server.

5. The method of claim 2, wherein the call type information comprises a call type from the group consisting of a barge-in call type and an invited call type.

6. The method of claim 2, wherein the PTT target information comprises a PTT target address.

7. The method of claim 6, wherein the PTT target address identifies a PTT group.

8. The method of claim 1, wherein the step of sending the PTT connection request information comprises sending a data burst message containing the PTT connection request information via the CDMA common control channel.

9. The method of claim 1, wherein the channel assignment request comprises a message from the group consisting of an IS-2000 Origination message and an IS-2000 Reconnect message.

10. The method of claim 9, wherein the channel assignment request further comprises a data burst message (DBM) portion.

11. The method of claim 10, wherein the DBM portion comprises the PTT connection request information.

12. The method of claim 1, wherein the indication of PTT connection acceptance comprises PTT target information.

13. The method of claim 12, wherein the PTT target information comprises a PTT target address.

14. The method of claim 1, wherein the indication of PTT connection acceptance is received via a traffic channel assigned in response to the channel assignment request.

15. The method of claim 1, further comprising sending and receiving, by the originator unit in an active packet data session, PTT voice information via a traffic channel assigned in response to the channel assignment request.

16. The method of claim 15, wherein sending and receiving the PTT voice information comprises sending and receiving the PTT voice information using Real Time Protocol (RTP).

17. A method for reducing push-to-talk (PTT) call setup delays comprising:
receiving, by a base station (BS) from a remote unit, PTT connection information via a CDMA common control channel;
sending, by the BS to a packet control function (PCF), the PTT connection information using an A9-Short Data Delivery message prior to a corresponding A9/A8 establishment with the PCF; and
assigning, by the BS to the remote unit, a traffic channel to support an active packet data session of the remote unit.

18. The method of claim 17, wherein assigning the traffic channel is performed after sending the PTT connection information.

19. The method of claim 17, wherein the traffic channel supports packet data PTT voice communication of the remote unit.

20. The method of claim 17, wherein the remote unit comprises an originator unit, wherein the PTT connection information comprises PTT connection request information, and wherein the method further comprises:
receiving, by the BS from the originator unit, a channel assignment request via the CDMA common control channel.

21. The method of claim 20, wherein the PTT connection request information comprises information from the group consisting of originator unit information, PTT server information, call type information, and PTT target information.

22. The method of claim 21, wherein the originator unit information comprises an IP address of the originator unit.

23. The method of claim 21, wherein the PTT server information comprises an IP address of a PTT server.

24. The method of claim 21, wherein the call type information comprises a call type from the group consisting of a barge-in call type and an invited call type.

25. The method of claim 21, wherein the PTT target information comprises a PTT target address.

26. The method of claim 25, wherein the PTT target address identifies a PTT group.

27. The method of claim 20, wherein the channel assignment request comprises a message from the group consisting of an IS-2000 Origination message and an IS-2000 Reconnect message.

28. The method of claim 27, wherein the channel assignment request comprises a data burst message (DBM) portion.

29. The method of claim 28, wherein the DBM portion comprises the PTT connection request information.

30. The method of claim 17, wherein the remote unit comprises a target unit, wherein the PTT connection information comprises PTT connection acceptance information, and wherein the method further comprises:
sending, by the BS to the target unit, a page message indicating a data connection is requested; and
receiving, by the BS from the target unit, a channel assignment request via the CDMA common control channel.

31. The method of claim 30, wherein the page message has a service option of "33".

32. The method of claim 30, wherein the PTT connection acceptance information is received in place of an IS-2000 Page Response.

33. The method of claim 32, wherein the PTT connection acceptance information is received via a message from the group consisting of an IS-2000 Data Burst Message and an IS-2000 Reconnect Message.

34. The method of claim 30, wherein the PTT connection acceptance information comprises information from the group consisting of PTT server information and PTT target information.

35. The method of claim 34, wherein the PTT server information comprises an IP address of a PTT server.

36. The method of claim 34, wherein the PTT target information comprises a PTT target address.

37. The method of claim 30, wherein the channel assignment request comprises a message from the group consisting of an IS-2000 Origination message and an IS-2000 Reconnect message.

38. The method of claim 30, wherein the channel assignment request further comprises a data burst message (DBM) portion.

39. The method of claim 38, wherein the DBM portion comprises the PTT connection acceptance information.

40. A method for reducing push-to-talk (PTT) call setup delays comprising:
receiving, by a target unit from a base station (BS), a page message indicating a data connection is requested;
sending, by the target unit to the BS in response to the page message, PTT connection acceptance information via a CDMA common control channel;
receiving, by the target unit from the BS, channel assignment messaging after sending the PTT connection acceptance information; and
receiving, by the target unit from the BS, PTT originator information.

41. The method of claim 40, wherein the PTT connection acceptance information is sent in place of an IS-2000 Page Response.

42. The method of claim 40, wherein the PTT connection acceptance information comprises information from the group consisting of PTT server information and PTT target information.

43. The method of claim 42, wherein the PTT server information comprises an IP address of a PTT server.

44. The method of claim 42, wherein the PTT target information comprises a PTT target address.

45. The method of claim 42, wherein the PTT target information comprises an IP address of the target unit.

46. The method of claim 40, further comprising sending, by the target unit to the BS in response to the page message, a responsive message from the group consisting of an IS-2000 Origination message and an IS-2000 Reconnect message.

47. The method of claim 46, wherein the responsive message further comprises a data burst message (DBM) portion.

48. The method of claim 47, wherein the DBM portion comprises the PTT connection acceptance information.

49. The method of claim 40, wherein the PTT originator information comprises information from the group consisting of originator unit information, PTT server information, and call type information.

50. The method of claim 40, wherein the PTT originator information is received via a traffic channel assigned in the channel assignment messaging.

51. The method of claim 40, further comprising sending and receiving, by the target unit in an active packet data session, PTT voice information via a traffic channel assigned in the channel assignment messaging.

52. A mobile station (MS) comprising:
a transceiver;
a processor, communicatively coupled to the transceiver,
   adapted to detect a user PTT request indication,
   adapted to send, to a base station (BS) via the transceiver, PTT connection request information via a CDMA common control channel,
   adapted to send, to the BS via the transceiver, a channel assignment request via the CDMA common control channel, and
   adapted to receive, from the BS via the transceiver, an indication of PTT connection acceptance corresponding to the PTT connection request information.

53. A base station (BS) comprising:
a transceiver;
a controller, communicatively coupled to the transceiver,
   adapted to receive, from a remote unit via the transceiver, PTT connection information via a CDMA common control channel,
   adapted to send, to a packet control function (PCF), the PTT connection information using an A9-Short Data Delivery message prior to a corresponding A9/A8 establishment with the PCF, and
   adapted to assign, to the remote unit, a traffic channel to support an active packet data session of the remote unit.

54. A mobile station (MS) comprising:
a transceiver;
a processor, communicatively coupled to the transceiver,
   adapted to receive, from a base station (BS) via the transceiver, a page message indicating a data connection is requested,
   adapted to send, to the BS via the transceiver in response to the page message, PTT connection acceptance information via a CDMA common control channel,
   adapted to receive, from the BS via the transceiver, channel assignment messaging after sending the PTT connection acceptance information, and
   adapted to receive, from the BS via the transceiver, PTT originator information.

* * * * *